United States Patent [19]

Nakamura et al.

[11] 4,407,353

[45] Oct. 4, 1983

[54] WASTE HEAT RECOVERY DEVICE FOR PREVENTING CORROSION BY SULFUR OXIDES

[75] Inventors: Tstomu Nakamura, Tokyo; Takashi Nakamoto, Matsudo; Tatuo Asada, Kawasaki; Kozo Taneda, Kodaira; Mitsuo Oshiro, Tokyo; Shigetoshi Takasu, Tokyo; Masao Kurihara, Yono, all of Japan

[73] Assignees: Snow Brand Milk Products Co., Ltd., Hokkaido; Suzuki Metal Industry Co., Ltd., Tokyo, both of Japan

[21] Appl. No.: 316,429

[22] Filed: Oct. 29, 1981

[30] Foreign Application Priority Data

Nov. 17, 1980 [JP] Japan ................. 55-161778

[51] Int. Cl.³ .................. B60H 1/00; B61D 27/00
[52] U.S. Cl. .................. 165/39; 165/134 DP; 73/215; 122/20 B; 122/135 R; 122/136 R; 122/451.1; 137/101.25; 236/12.1
[58] Field of Search ........... 165/39, 134 DP, DIG. 2; 122/20 B, 451.1, 135 R, 136 R; 73/215; 237/12.3 R, 12.3 A, 12.3 B; 138/41; 137/90, 101.25, 101.27

[56] References Cited

U.S. PATENT DOCUMENTS

| 1,077,316 | 11/1913 | Sutro ................. 137/101.27 |
| 1,190,400 | 9/1914 | Giele ................. 73/215 |
| 1,827,950 | 3/1928 | Mulligan ................. 122/451.1 |
| 2,169,359 | 2/1938 | Jones ................. 138/41 X |
| 2,371,203 | 1/1944 | Whitesel ................. 138/41 X |
| 3,217,750 | 11/1965 | Thomas ................. 138/41 |
| 3,986,665 | 10/1976 | Kofink ................. 237/12.3 A |
| 4,146,176 | 3/1979 | Beauvais ................. 237/12.3 A |
| 4,149,453 | 4/1979 | Reed ................. 98/47 X |
| 4,354,932 | 10/1982 | McNeil ................. 138/41 |

FOREIGN PATENT DOCUMENTS 2903076 2/1979 Fed. Rep. of Germany ...... 165/134 DP

Primary Examiner—Henry C. Yuen
Assistant Examiner—David E. Helmbold
Attorney, Agent, or Firm—Burgess, Ryan & Wayne

[57] ABSTRACT

In a boiler or an industrial furnace, a temperature detecting sensor is mounted at the heat absorbing side of a heat pipe of a waste heat recovery device which is disposed in part of the path of exhaust gas. With an output signal of the temperature detecting sensor, a flow rate control valve is controlled, and a liquid discharging shield is utilized to maintain the flow rate of the liquid to be supplied in correspondence with the flow rate of the liquid to be discharged. The effective area of the heat pipes coming in contact with the liquid is varied to maintain the temperature at a heat absorbing side higher than the dew point of sulfur oxide, thus preventing the heat pipes from corrosion, exhaust ducts and so on, and allowing heat absorbing operation to be performed in accordance with the exhaust gas discharge temperature.

4 Claims, 5 Drawing Figures

Fig.5
(a)
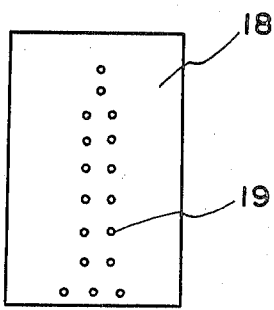
(b)
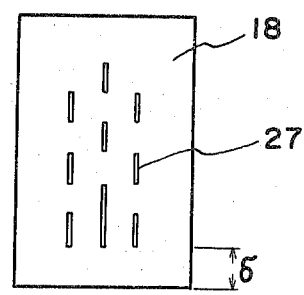
(c)
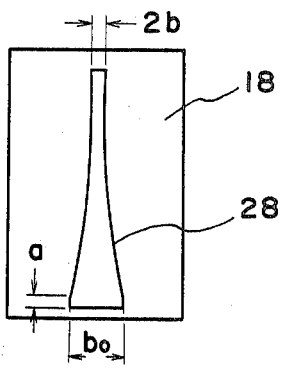

WASTE HEAT RECOVERY DEVICE FOR PREVENTING CORROSION BY SULFUR OXIDES

BACKGROUND OF THE INVENTION

The present invention relates to a waste heat recovery device for a boiler or the like and, more particularly, to a waste heat recovery device which prevents the heat conduction surfaces of a heat exchanger from corrosion by sulfur oxides contained in exhaust gas.

In a boiler or an industrial furnace which uses a fuel such as a heavy fuel oil containing sulfur, or an incinerator which exhausts a sulfur oxide $SO_x$, a problem has been noted in that the heat conduction surfaces of a water heat exchanger are corroded by sulfur oxide $SO_x$ in the exhaust gas. The surface temperature of a heat conduction coil of the typical water heat exchanger is slightly higher than the water temperature. Therefore, even if the temperature of the exhaust gas flowing through a duct is higher than the dew point of the sulfur oxide $SO_x$ (the dew point may vary in accordance with the sulfur content of the exhaust gas, but is substantially 140° C.), the temperature of the exhaust gas is lowered when it comes in contact with the surface of the heat conduction coil. The sulfur oxide $SO_x$ contained in the exhaust gas condenses on the surface of the heat conduction coil. As a result, the sulfur oxide $SO_x$ is converted to sulfuric acid and then corrodes the surface of the heat conduction coil.

In order to avoid this problem, a waste heat recovery device is provided which utilizes the constant temperature characteristic of a heat pipe which is maintained at the temperature of a heat-receiving side. For example, Japanese Utility Model Publication No. 55-18,641 proposes a waste heat recovery device of this type. However, if this device is installed in a boiler or the like having load fluctuations, the surface temperature of the heat conduction coil of the heat pipe at the heat-absorbing side changes in proportion to a change in temperature $Tg$ of the exhaust gas. With a decrease in the temperature $Tg$ of the exhaust gas, a surface temperature $Tm$ of the conduction coil at the heat-absorbing side is lowered below the dew point of the sulfur oxide $SO_x$, as shown in FIG. 1. Therefore, the surface of the heat conduction coil is corroded by the sulfur oxide $SO_x$, the coil is blocked, and service life of the pipe is degraded. (Referring to FIG. 1, $Tgi$ denotes the temperature at an inlet port; $Tgo$, the temperature of the gas at an outlet port; $Two$, the temperature of water at the outlet port; and $Twi$, the temperature of water at the inlet port.) Furthermore, the temperature $Tg$ of the exhaust gas becomes lower than a predetermined level due to the heat absorbing action of the waste heat recovery device. The problem in which the duct or the inside of the chimney is corroded by the sulfur oxide $SO_x$ has not yet been solved.

SUMMARY OF THE INVENTION

It is an object of the present invention to provide a waste heat recovery device which constantly maintains a surface temperature of a heat pipe at a heat-absorbing side higher than the dew point of a sulfur oxide $SO_x$, even if the load of a boiler or an industrial furnace fluctuates, and which prevents the heat pipe from corrosion by the sulfur oxide.

It is another object of the present invention to provide a waste heat recovery device which absorbs heat in accordance with the temperature of the exhaust gas and which protects a duct or the inside of a chimney against corrosion by the sulfur oxide $SO_x$.

In order to achieve the above and other objects of the present invention, there is provided a waste heat recovery device for preventing corrosion by sulfur oxide, comprising a heat pipe which is mounted at a heat-receiving side for receiving heat of exhaust gas at one end and which is mounted to a liquid heating section at the other end, a sensor mounted at the heat-absorbing side of the heat pipe for detecting the temperature of the heat pipe, a flow rate controlling means for controlling the flow rate of a liquid supplied to the liquid heating section in response to a differential signal between an output signal from the temperature detecting sensor and a signal representing a dew point of the sulfur oxide, and a liquid discharging means for controlling a level of liquid in the liquid heating section in correspondence to the flow rate of the liquid supplied.

BRIEF DESCRIPTION OF THE DRAWINGS

FIG. 5 shows the shape of orifices according to other embodiments of the present invention.

DESCRIPTION OF THE PREFERRED EMBODIMENTS

Figure 1:
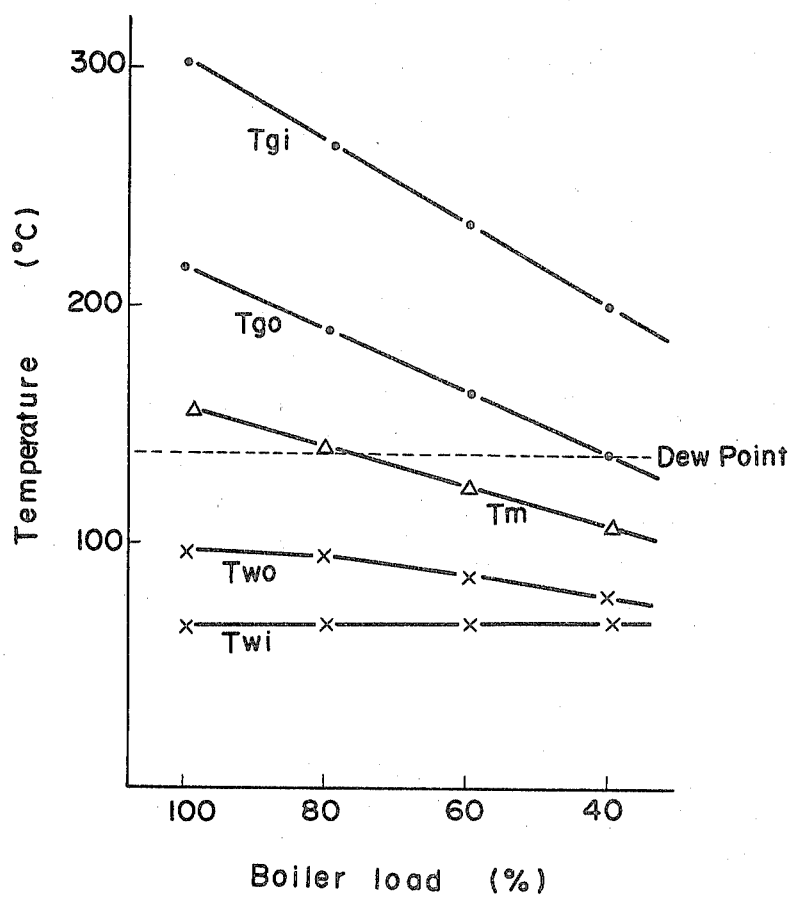
FIG. 1 is a graph for explaining the relations among boiler load, temperature of combustion exhaust gas, surface temperature of a heat pipe at a heat-side, and water temperature.
Figure 2:
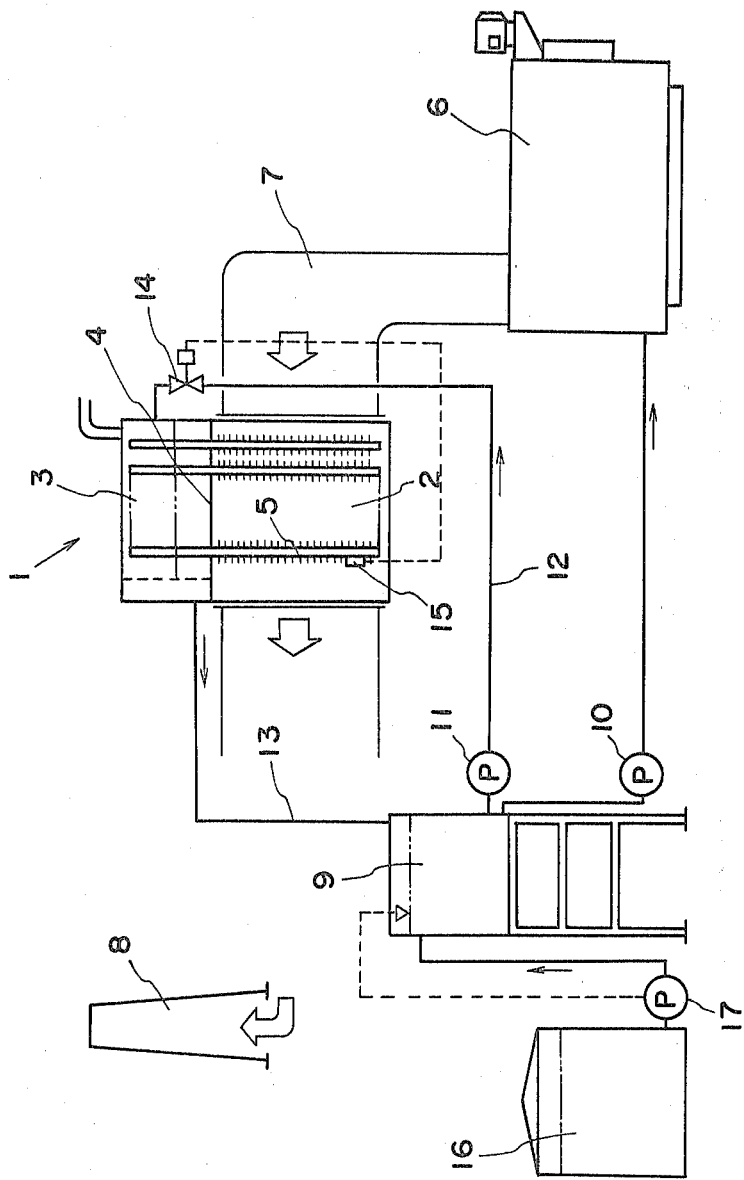
FIG. 2 is a schematic diagram of water heating equipment which employs a waste heat recovery device of the present invention.

FIG. 2 is a schematic diagram of water heating equipment employing a waste heat recovery device of the present invention. A waste heat recovery device 1 is constituted by an heat receiving section 2 which receives thermal energy from a exhaust gas and a water heating section 3 which is part of a channel for water supplied to a boiler. The waste heat recovery device 1 further includes a partition wall 4 which divides the heat receiving section 2 from the water heating section 3 and which is made of a metal resistant to corrosion such as stainless steel. A number of heat pipes 5 are firmly fixed to the partition wall 4 and have a heat absorbing part in the heat receiving section 2 and a heat radiation part in the water heating section 3. The waste heat recovery device 1 is arranged in the path of a exhaust duct 7 between a boiler 6 and a chimney 8. A balance tank 9 supplies water to the boiler 6 through a water pump 10. Between the balance tank 9 and the water heating section 3 are disposed a water supply pipe 12 which supplies water within the balance tank 9 to the water heating section 3 through a circulating pump 11, and a water discharge pipe 13 which circulates water in the water heating section 3 to the balance tank 9. The water supply pipe 12 is provided with a flow rate control valve 14 which operates in response to an output signal of a temperature detecting sensor 15 mounted on the surface of the heat pipe 5. Further, water is supplied from a water supply tank 16 to the balance tank 9 by an auxiliary water supply pump 17, in correspondence to the water level of the balance tank 9.

A drain hole may be formed below the water heating section 3 to introduce steam from the boiler 6, to be condensed in the channel at the loading side. This high temperature drain may be utilized to preheat water for the water heating section 3, as needed even though this structure is not directly related to the present invention.

Figure 3:
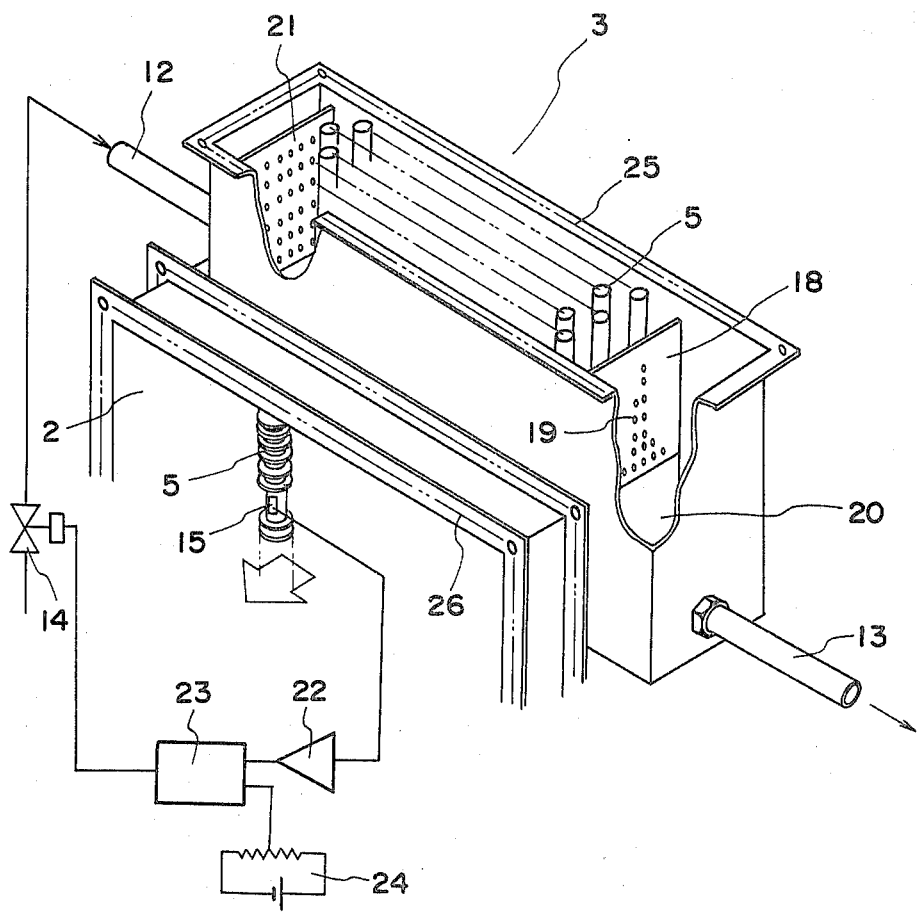
FIG. 3 is a perspective view of one embodiment of the waste heat recovery device according to the present invention.

FIG. 3 is a perspective view illustrating the water heating section 3 in detail according to the embodiment of the present invention. A shield 18 is arranged at the discharge side of the water heating section 3 and has a number of holes 19 in a predetermined pattern in the direction of height in order to maintain the water level in the water heating section 3 in correspondence with the flow rate of water to be supplied. A flow rate dQ of water to be discharged through one hole 19 below the water level is given by the following relation:

$$dQ = C \cdot \pi d^2/4 \cdot \sqrt{2g \cdot h} \tag{1}$$

where h is the water level in the water heating section 3, d is the diameter of the hole 19, C is the coefficient of contraction, and g is the acceleration of gravity. The diameter of the holes 19 and the number of these holes of each stage at respective heights are determined in advance so that the total flow rate of the water to be discharged becomes equal to a flow rate Q of water to be supplied from the water supply pipe 12. Further, a reservoir 20 for receiving excess water is arranged at the lower part of the water discharge side of the shield 18. In this manner, a damper function is provided to store excess water temporarily discharged through the holes 19 when the flow rate of water to be supplied is decreased. A baffle 21 which is made of a metal net or punched board is mounted within the water heating section 3 in the vicinity of the joint section of the water supply pipe 12. The baffle 21 makes an inflow of water supplied to the water heating section 3 constant and the water contacts with respective heat pipes 5.

The temperature detecting sensor 15 described above which is constituted by a resistive element is attached on the surface of the heat pipe 5 at a gas outlet port on the water supplying side of the heat receiving section 2, that is, at the part where the surface temperature of the heat pipe 5 becomes lowest. An output signal from the temperature detecting sensor 15 is supplied to a comparator 23 through an amplifier 22. This signal is compared with an output signal from a temperature setting circuit 24 by the comparator 23. The flow rate control valve 14 is driven in response to a differential signal supplied from the comparator 23. A flange 25 for mounting a cover is provided on the upper part of the waste heat recovery device 1. Further, a flange 26 for mounting the heat receiving section 2 to the exhaust duct 7 is provided.

Figure 4:
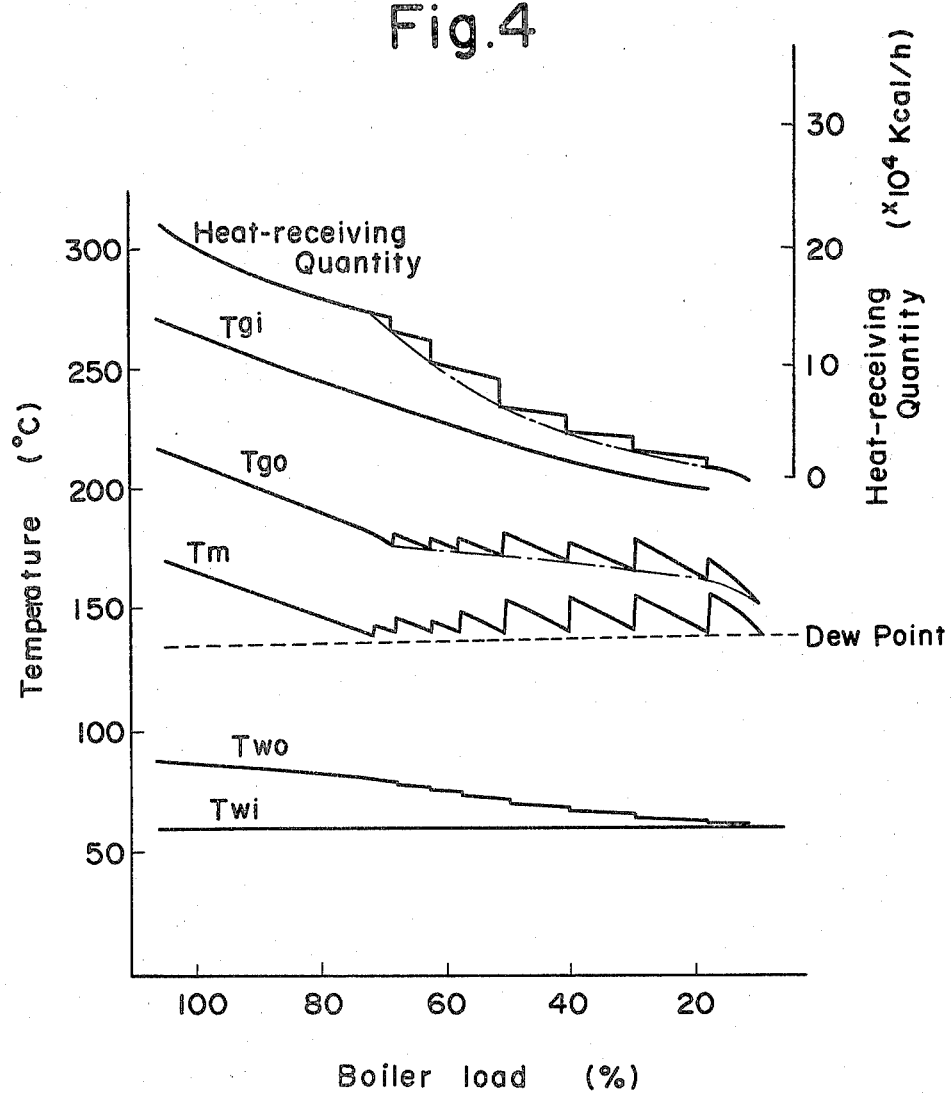
FIG. 4 is a graph for explaining the relations among the boiler load, the temperature of the exhaust gas, the surface temperature of the heat pipe at the heat-absorbing side and the water temperature, according to the waste heat recovery device of the present invention.

The mode of operation of the embodiment of the present invention will now be described with reference to FIGS. 3 and 4. In the operating condition in which the boiler 6 operates at substantially the rated output, the flow rate control valve 14 is fully opened and water is filled to the highest water level of the water heating section 3, since the temperature of the combustion exhaust gas is sufficiently high. In this manner, even if maximum heat exchange is performed, the surface temperature Tm of the heat pipe 5 at the heat-absorbing side is maintained higher than the dew point of the sulfur oxide $SO_x$.

When the load of the boiler 6 is reduced, for example, less than 70% in nighttime operation, the surface temperature Tm of the heat pipe 5 at the heat-absorbing side is lowered in correspondence with a decrease in the temperature Tg of the exhaust gas. The temperature Tm is converted to an electric signal by the temperature detecting sensor 15, and the signal is amplified and supplied to the comparator 23. A critical temperature to be determined by a heavy fuel oil, that is, the dew point (generally, 140° to 145° C.) of the sulfur oxide $SO_x$, is preset in the temperature setting circuit 24. An electric signal corresponding to the set temperature is supplied to the comparator 23. The comparator 23 compares the electric signal from the temperature detecting sensor 15 and an electric signal from the temperature setting circuit 24. When the surface temperature Tm of the heat pipe 5 becomes lower than the set temperature, the comparator 23 produces a signal to adjust the flow rate control valve 14. As a result, the flow rate of water supplied to the water heating section 3 is reduced, and water is discharged at the shield having the holes 19, until a new equilibrium level is obtained. When this level is obtained, the flow rate of water to be supplied becomes equal to the flow rate of water to be discharged. Therefore, the water flow within the water heating section 3 is maintained constant due to the rectifying action of the baffle 21 and the holes 19 of the shield 18. The area of the heat pipes 5 which is used for heat exchange with the water is reduced only at the heat radiation side. With this decrease, heat absorption is also reduced. In this manner, the surface temperature Tm of the heat pipe 5 is maintained above the critical temperature, and at the same time the temperature Tg of the exhaust gas is not much lowered. When the surface temperature Tm of the heat pipe 5 is maintained above the dew point of the sulfur oxide $SO_x$, the temperature Tg of the exhaust gas passing through the heat receiving section 2 is also maintained above the dew point of the sulfur oxide $SO_x$. Even if the temperature of the exhaust gas is slightly lowered by passing through the exhaust duct 7 and the chimney 8, the sulfur oxide $SO_x$ does not condense on the inner surface of the exhaust duct 7 and the chimney 8.

When the temperature Tg of the exhaust gas is raised, the surface temperature Tm of the heat pipe 5 is also raised. Subsequently, when the flow rate of water to be supplied increased, and when the flow rate of water to be discharged temporarily exceeds the capacity of the water discharge pipe 13, excess water is collected in the reservoir 20 for receiving excess water which is disposed at the lower part of the shield 18 on the water discharging side. When an equilibrium level is then obtained, the flow rate of water to be supplied becomes equal to the flow rate of water to be discharged. Therefore, the water flow within the water heating section 3 is maintained constant.

FIG. 5 shows different arrangements of orifices according to other embodiments of the present invention. Referring to FIG. 5(a), the arrangement is such that the number n of holes for each stage is selected according to the height so that the flow rate Q of water has a linear relation with the water level h. The total flow rate Q of water to be discharged is given by the following relation:

$$Q = \sum_{i=1}^{h} \frac{\pi d^2}{4} C n_i \sqrt{2g \cdot h_i} \quad (2)$$

$$= K \sum_{i=1}^{h} n_i \sqrt{h_i}$$

where $$K = \frac{\pi d^2}{4} \cdot C \cdot \sqrt{2g}$$

According to relation (2), above, the number n of holes in each stage i and the diameter d of the holes 19 are determined so that the flow rate Q of water to be discharged and the water level h have a linear relation.

If a water velocity V within the water heating section 3 is 30 mm/sec and the diameter d of the hole 19 is 10 mm, the data shown below is obtained:

| Water Level (h) mm | Number of Holes (n) |
| --- | --- |
| 700 | 1 |
| 600 | 2 |
| 500 | 2 |
| 400 | 2 |
| 300 | 2 |
| 200 | 2 |
| 100 | 2 |
| 50 | 2 |
| 25 | 3 |

Referring to FIG. 5(b), orifices in another embodiment if the present invention are constituted by a number of slits 27. Water is stored up to a height δ from the bottom of the water heating section 3 so that the water which comes in contact with the heat pipes 5 is not completely evaporated.

Referring to FIG. 5(c), an orifice is arranged so that the flow rate Q of water to be supplied has a linear relation with the water level according to another embodiment of the present invention. This orifice is a slit 28 which is called a "proportional gate". The shape of the orifice is selected to satisfy the following relation.

$$2b = \frac{2b_o}{\pi} \tan^{-1} \sqrt{\frac{a}{h-a}}$$

where 2b is the width of the upper side, bo is the width of the lower side, and a is the height of the rectangular section.

What is claimed is:

1. A waste heat recovery device for preventing corrosion by sulfur oxide, comprising a heat pipe which is mounted at a heat-receiving side for receiving heat of exhaust gas at one end and which is mounted to a liquid heating section for heating a liquid supplied at the other end, a sensor mounted at the heat-absorbing side of said heat pipe for detecting the temperature of said heat pipe, flow rate controlling means for controlling a flow rate of the liquid supplied to said liquid heating section in response to a differential signal between an output signal from said temperature detecting sensor and a signal representing a dew point of the sulfur oxide, and a liquid discharging means for controlling a level of liquid in said liquid heating section in correspondence to the flow rate of the liquid supplied.

2. A device according to claim 1, wherein a rectifying member in which a number of holes are formed is provided to rectify the liquid flowing into said liquid heating section at a liquid supply side thereof.

3. A device according to claim 1, wherein said liquid discharging means is provided with a shield with a discharge hole, said shield sealing the liquid discharge side of said liquid heating section, and said discharge hole being formed so that a flow rate of the liquid to be supplied has a linear relation with a flow rate of the liquid to be discharged.

4. A device according to claim 1, wherein a reservoir is provided for receiving excess water temporarily discharged at the liquid discharge side of said liquid discharging means of said liquid heating section.

* * * * *